United States Patent
Leonard

(10) Patent No.: US 9,239,040 B2
(45) Date of Patent: Jan. 19, 2016

(54) ROOT END ASSEMBLY CONFIGURATION FOR A WIND TURBINE ROTOR BLADE AND ASSOCIATED FORMING METHODS

(75) Inventor: Jay F. Leonard, Greenville, SC (US)

(73) Assignee: General Electric Company, Schenectady, NY (US)

( * ) Notice: Subject to any disclaimer, the term of this patent is extended or adjusted under 35 U.S.C. 154(b) by 776 days.

(21) Appl. No.: 13/397,786

(22) Filed: Feb. 16, 2012

(65) Prior Publication Data

US 2013/0216394 A1 Aug. 22, 2013

(51) Int. Cl.
*F03D 11/04* (2006.01)
*F03D 1/06* (2006.01)

(52) U.S. Cl.
CPC ........... *F03D 1/0658* (2013.01); *F05B 2260/79* (2013.01); *Y02E 10/721* (2013.01)

(58) Field of Classification Search
CPC .... F03D 1/0658; F03D 1/0675; F03D 1/0691
USPC .................................................. 416/239, 209
See application file for complete search history.

(56) References Cited

U.S. PATENT DOCUMENTS

| | | | |
|---|---|---|---|
| 3,734,642 A * | 5/1973 | Dixon | 416/61 |
| 6,910,867 B2 | 6/2005 | Corten | |
| 6,942,461 B2 | 9/2005 | Wobben | |
| 7,381,029 B2 | 6/2008 | Moroz | |
| 7,780,417 B2 * | 8/2010 | Kirchner et al. | 416/207 |
| 2007/0297909 A1 | 12/2007 | Wobben | |
| 2009/0148291 A1 | 6/2009 | Gerber et al. | |
| 2010/0098552 A1 | 4/2010 | Aarhus | |
| 2010/0135811 A1 | 6/2010 | Kirtley et al. | |

FOREIGN PATENT DOCUMENTS

| | | |
|---|---|---|
| WO | WO 01/42647 A2 | 6/2001 |
| WO | WO 03/060319 A1 | 7/2003 |
| WO | WO 2011/050806 A2 | 5/2011 |

OTHER PUBLICATIONS

Danish Search Report, Sep. 30, 2014.

* cited by examiner

*Primary Examiner* — Nathaniel Wiehe
*Assistant Examiner* — Jeffrey A Brownson
(74) *Attorney, Agent, or Firm* — Dority & Manning, P.A.

(57) ABSTRACT

An assembly configuration between a wind turbine rotor blade and a rotor hub includes a rotor hub having one or more pitch bearings, with each pitch bearing having an outer diameter race and an inner diameter race. Rotor blades are affixed to the respective pitch bearing rings, with the rotor blades having a root end with an outer diameter. An adaptor is configured between the root end and the pitch bearing, with the adaptor affixed to the inner diameter race and the root end affixed to the adaptor. The adaptor defines a mounting surface for the root end radially inward of the pitch bearing such that the root end outer diameter is less than the diameter of the inner diameter race.

9 Claims, 7 Drawing Sheets

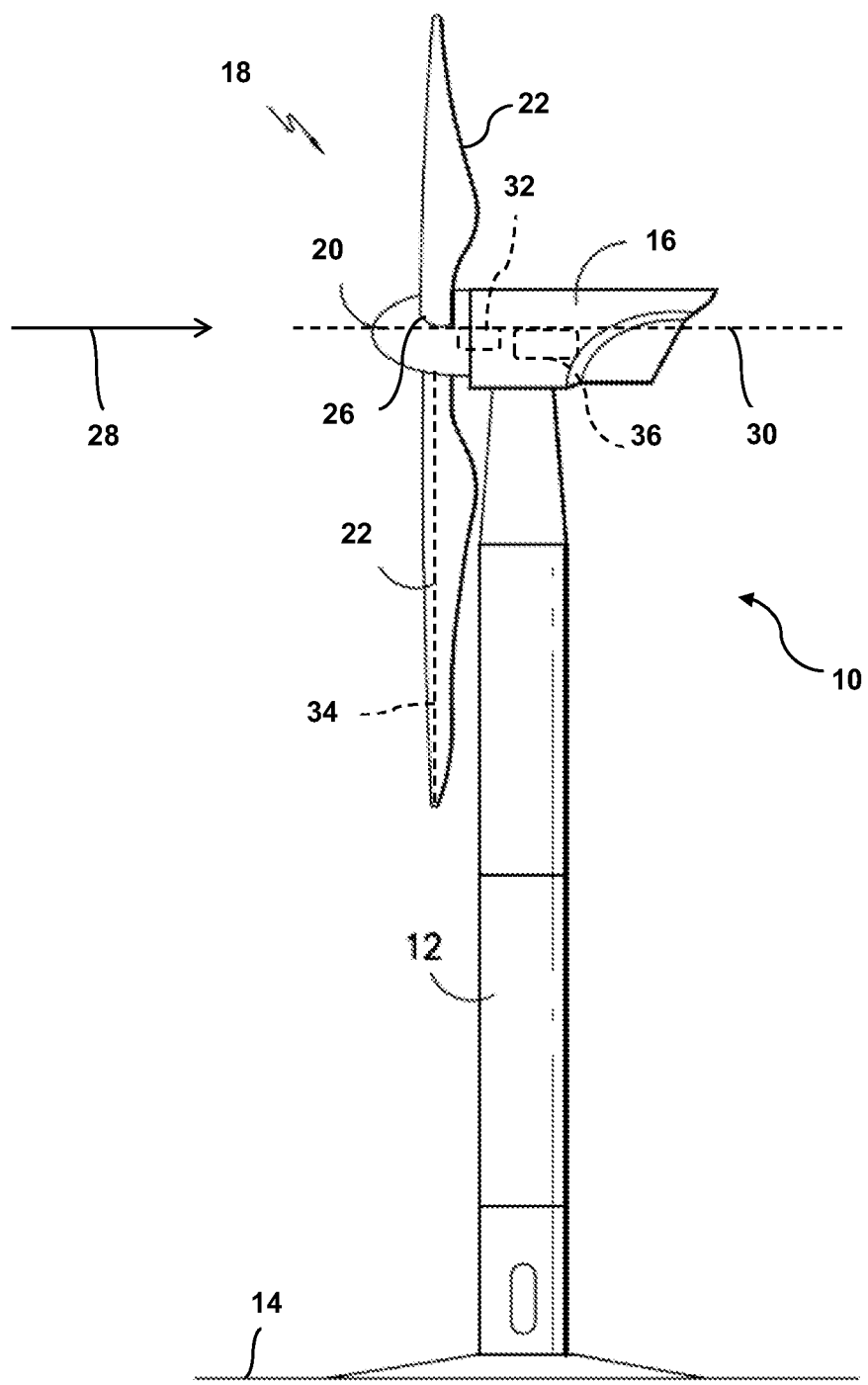
FIG. -1-
PRIOR ART

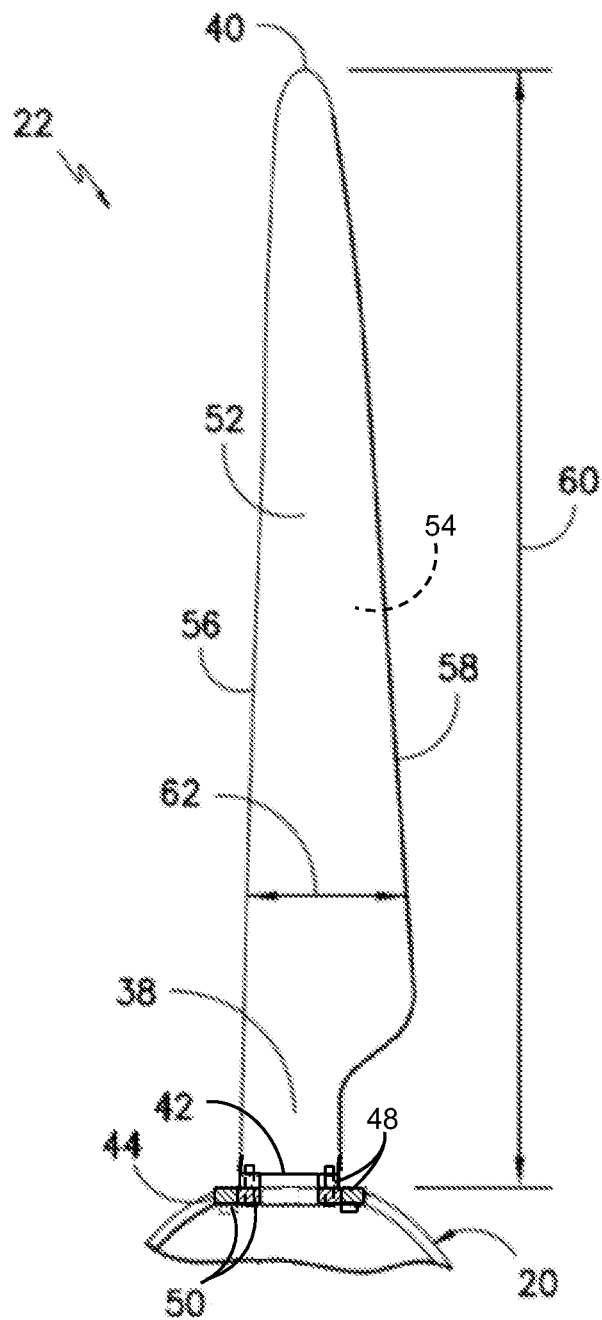
FIG. -2-
PRIOR ART

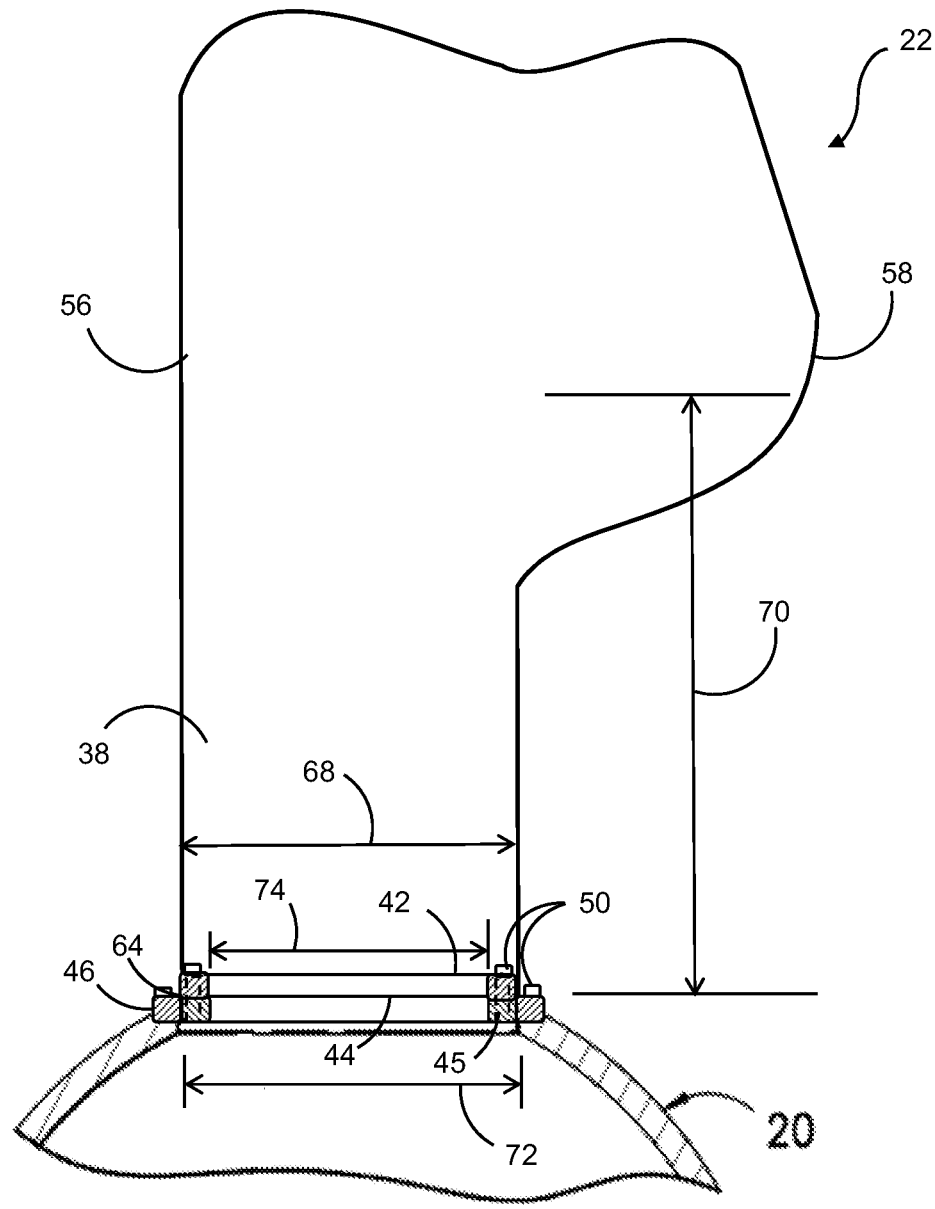
FIG. -3-
PRIOR ART

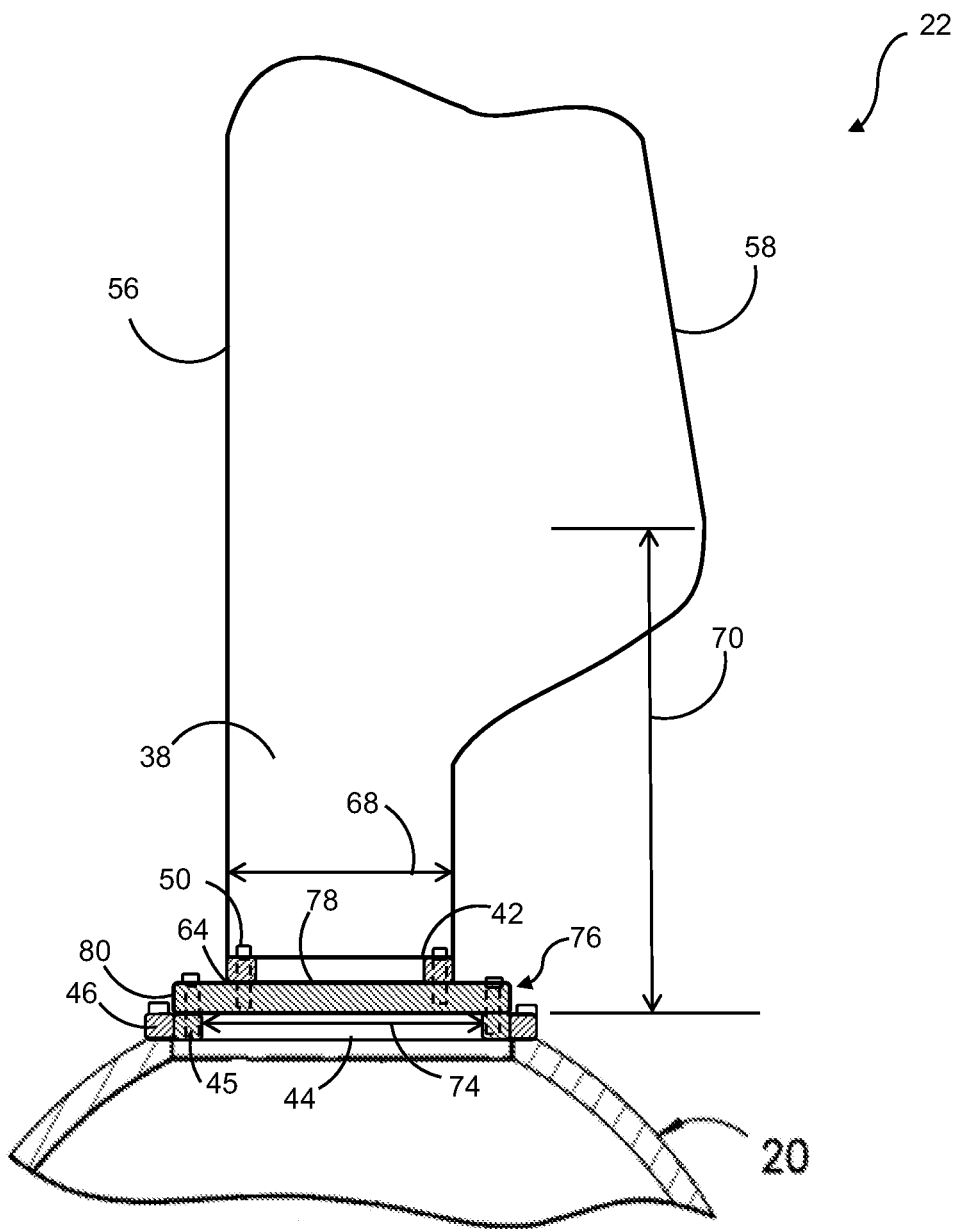
FIG. -4-

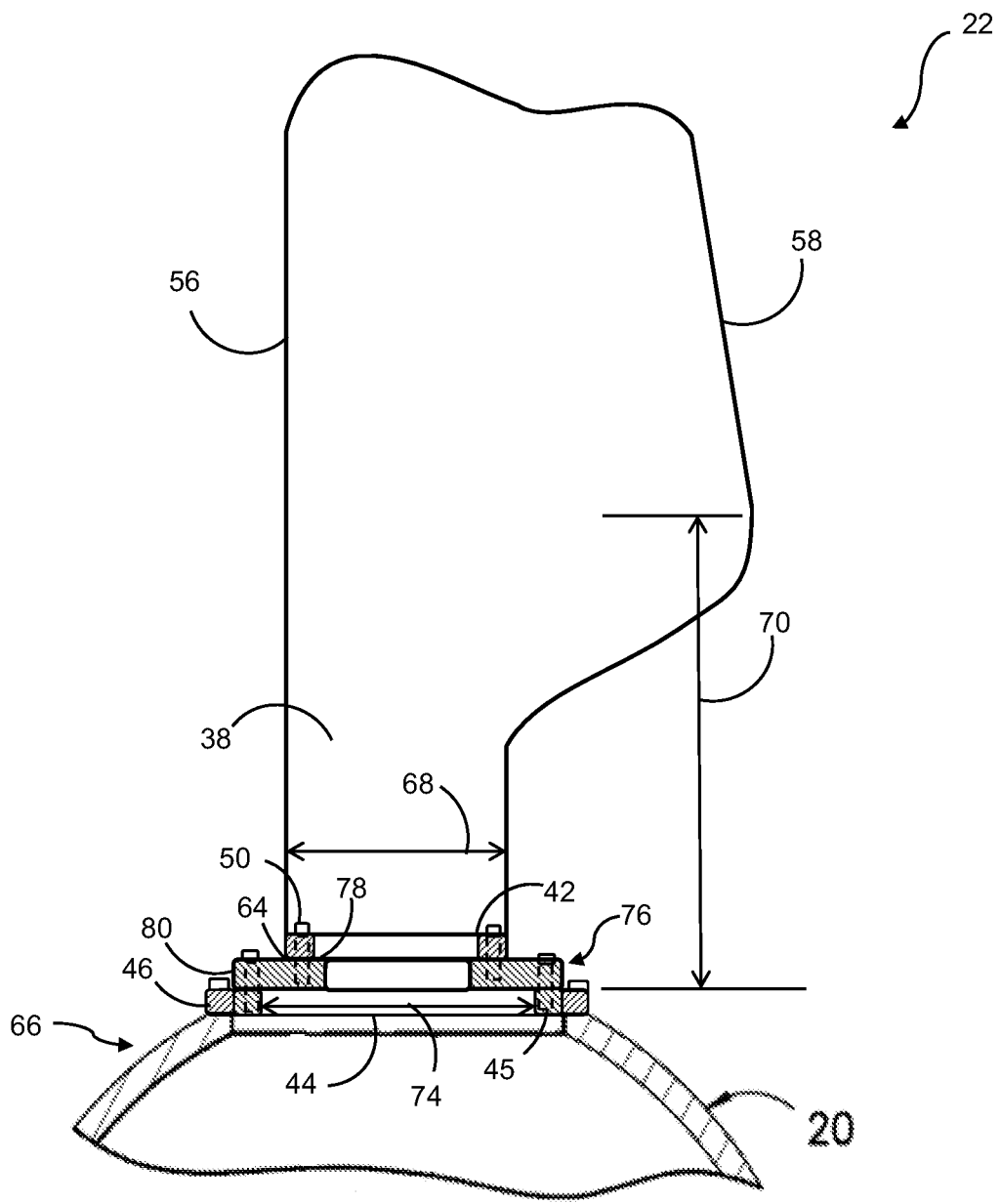
FIG. -5-

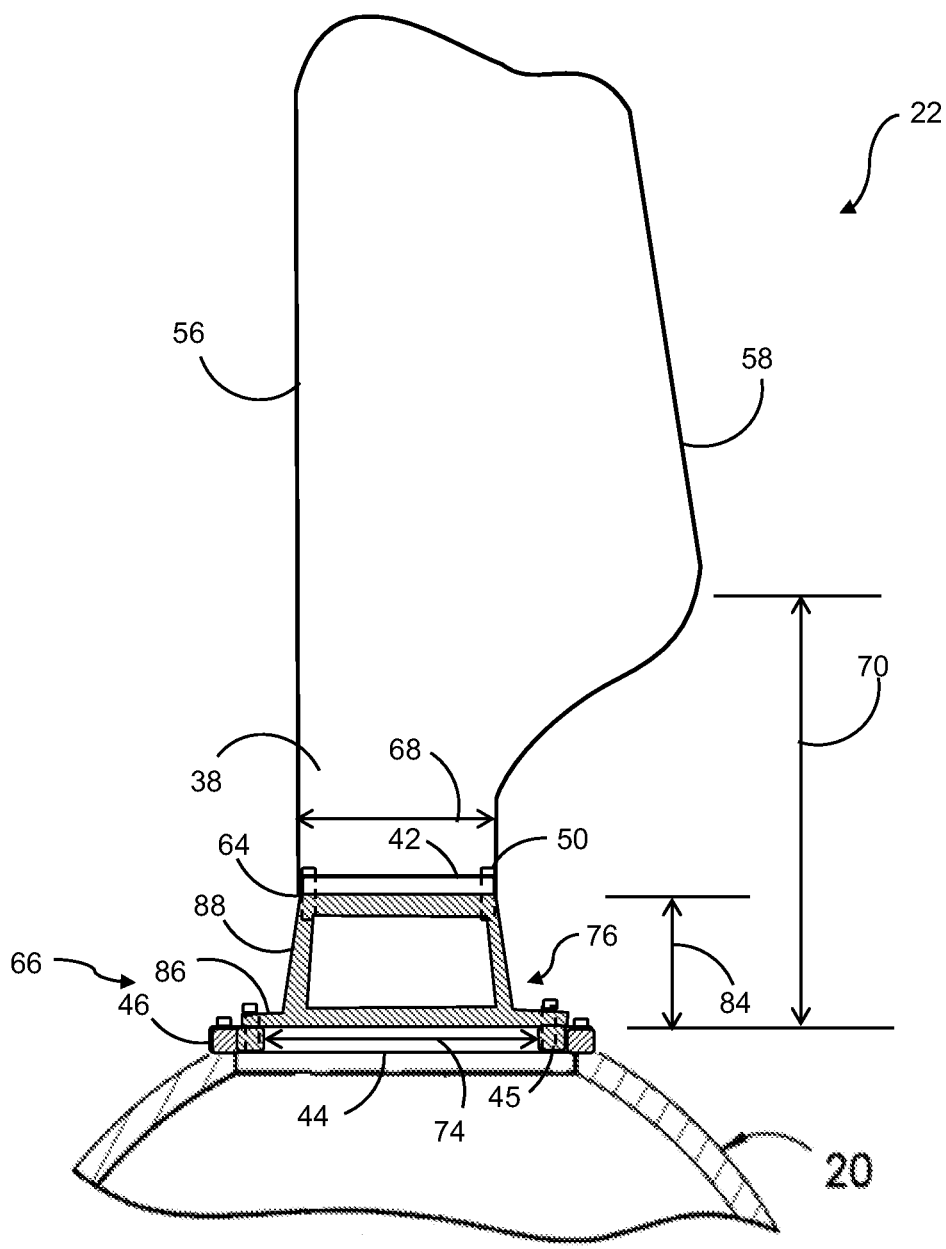
FIG. -6-

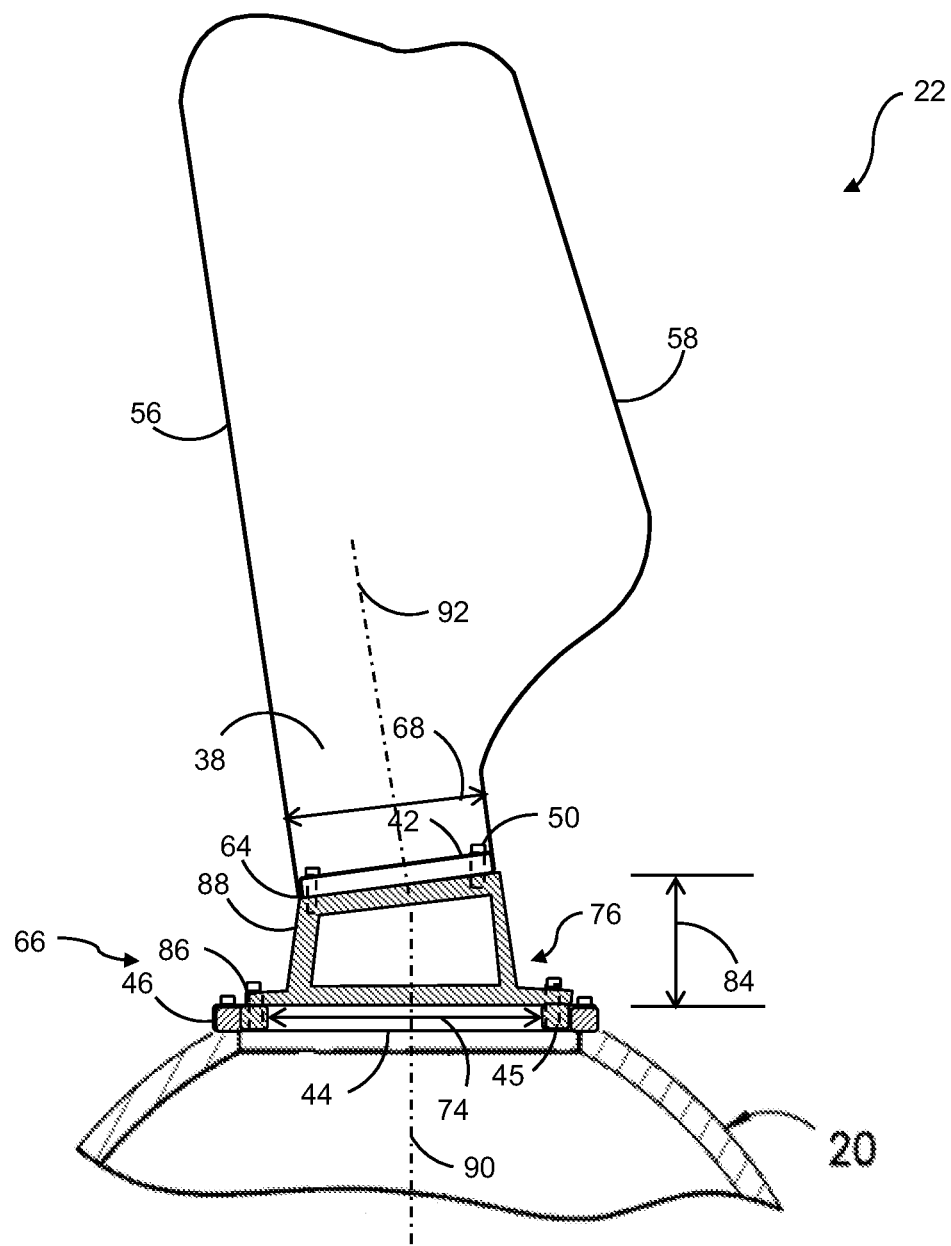
FIG. -7-

ROOT END ASSEMBLY CONFIGURATION FOR A WIND TURBINE ROTOR BLADE AND ASSOCIATED FORMING METHODS

FIELD OF THE INVENTION

The present subject matter relates generally to rotor blades for a wind turbine and, more particularly, to a rotor blade assembly including an expansion assembly for increasing the energy output of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

With conventional designs, a pitch bearing is assembled to the rotor hub for each respective rotor blade, with the root end of the blade bolted directly to the pitch bearing. The pitch bearing design is driven largely by the finite stiffness of the parts to which the bearing mates, particularly the blade root. The bearings deform less under load when the component they are attached to has a greater stiffness. For larger rotor designs, the pitch bearing design margins are often the parameter that dictates the blade root diameter. However, the root area of the blade contributes little to the efficiency of the blade and current blade radius of curvature design/manufacturing limits result in a relatively long spanwise transition from the relatively large root end to the thinner airfoil section of the blade. As such, as the wind turbines increase in size and output (with the corresponding increase in blade size), the cost of the rotor assembly increases as a function of pitch bearing design margins without a proportional increase in blade efficiency.

Accordingly, there is need for an improved bearing/blade root configuration that enables more cost effective rotor system designs and provides for a shorter span-wise transition from the root to the airfoil section of the blade without necessarily decreasing the overall spanwise length of the blades.

BRIEF DESCRIPTION OF THE INVENTION

Aspects and advantages of the invention will be set forth in part in the following description, or may be obvious from the description, or may be learned through practice of the invention.

The present subject matter relates to an assembly for making various blade root diameters work with a given turbine hub and pitch bearing.

In one aspect, the present subject matter discloses an assembly configuration between a wind turbine rotor blade and a rotor hub, wherein the rotor hub includes pitch bearings with an outer diameter race and an inner diameter race. A root end of a rotor blade is affixed to each respective pitch bearing, with the root end having an outer diameter. A transition piece or adaptor is configured between the root end and the bearing ring, with the adaptor affixed to the inner diameter race of the pitch bearing and the root end affixed to the adaptor. The adaptor defines a mounting surface for the root end that is may be offset spanwise (at least by the thickness of the adaptor) and radially inward of the pitch bearing such that the outer diameter of the root end is less than the diameter of the inner diameter race. For example, the inner diameter race may completely circumscribe the root end of the rotor blade.

The adaptor may be variously configured. For example, in a particular embodiment, the adaptor may be a solid plate member. In an alternate embodiment, the adaptor may be a ring member having a circumferential mounting surface for the root end of the rotor blade. Another possible embodiment may be a spoke-style configuration wherein discrete bars stiffen the bearing in the radial direction.

In certain desirable embodiments, the adaptor is formed from a material that is as stiff or stiffer than the rotor blades so as to provide an increased stiffness at the transition between the rotor blade and bearing ring. For example, the rotor blades may be a conventional composite material, whereas the adaptor is a stiffer composite material or a metal, such as a cast metal component. With this configuration, the bearing ring deforms less under blade-induced loads. It should also be understood that the stiffening adaptor may be a separate piece or may be combined with the blade to become an integral feature of the blade root.

In a particular embodiment, the adaptor may also be designed to provide a spanwise offset relative to the pitch bearing such that the blade root mounting surface is at a different spanwise position relative to a radially outer edge of the adaptor, thereby changing (e.g., increasing) the overall effective diameter of the wind turbine rotor without changing the length of the rotor blades. For example, the adaptor may include a radially outer ring affixed to the bearing inner diameter race, whereas the mounting surface circumscribed within and offset spanwise from this outer ring. With this embodiment, the adaptor may have truncated side walls relative to the outer ring, with the mounting surface defined at the ends of the side walls.

With still another embodiment, the adaptor may also serve to change the cone angle of the rotor without changing the blade or hub components. For example, the blade root end mounting surface may be in a non-parallel plane relative to the plane of the bearing race to which the adaptor is attached, thereby providing an angular offset between the blade root centerline axis and the pitch bearing centerline axis.

The present invention also encompasses various method embodiments for improving the overall efficiency of a wind turbine, particularly the blade design. For example, one method embodiment reduces the spanwise transition from a root end to an airfoil section of the rotor blades in a wind turbine having a given rotor blade diameter, thereby increasing the efficiency of the blades without necessarily increasing the overall spanwise length of the blades. This method may include assembly of a transition component between the root end of the rotor blade and a respective race of a pitch bearing to which the root end attaches. The diameter of the root end may be defined to be different than the diameter of the pitch bearing race, with the root end being affixed to the transition component. In this manner, the method reduces or eliminates the span between the root end of the rotor blade and the airfoil section so as to increase the overall spanwise length of the airfoil section of the rotor blade.

In a particular method embodiment, the diameter of the root end of the rotor blade is reduced relative to the diameter of the pitch bearing race.

The method may include forming the transition component from metal, for example a cast metal component, thereby providing an increased stiffness between the bearing ring and rotor blade such that the bearing ring deforms less under rotor blade induced loads. With this configuration, the design load margins for the bearing rings may be increased as a function of the increased stiffness added by the transition component.

Another method embodiment, may include effectively changing the overall rotor diameter without changing blade length by offsetting the transition component spanwise relative to the pitch bearing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine of conventional construction;

FIG. 2 illustrates a suction side view of a rotor blade of conventional construction;

FIG. 3 illustrates a suction side view of a conventional assembly configuration between the rotor blade root end and a pitch bearing ring;

FIG. 4 illustrates a suction side view of an embodiment of an assembly configuration between the rotor blade root end and a pitch bearing ring in accordance with aspects of the invention;

FIG. 5 illustrates a suction side view of another embodiment of an assembly configuration between the rotor blade root end and a pitch bearing ring in accordance with aspects of the invention;

FIG. 6 illustrates a suction side view of yet another embodiment of an assembly configuration between the rotor blade root end and a pitch bearing ring in accordance with aspects of the invention; and FIG. 7 illustrates a suction side view of still a further embodiment of an assembly configuration between the rotor blade root end and a pitch bearing ring in accordance with aspects of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of a wind turbine 10 of conventional horizontal-axis construction. However, it should be appreciated that the wind turbine 10 may be a vertical-axis wind turbine. In the illustrated embodiment, the wind turbine 10 includes a tower 12 that extends from a support surface 14, a nacelle 16 mounted atop the tower 12, and a rotor 18 that is coupled to the nacelle 16. The rotor 18 includes a rotatable hub 20 and at least one rotor blade 22 coupled to and extending outward from the hub 20. As shown, the rotor 18 includes three rotor blades 22. However, in an alternative embodiment, the rotor 18 may include more or less than three rotor blades 22. The rotor 18 has an effective rotational diameter defined by the hub 20, blades 22, and thickness of the attachment mechanism between the blades and hub.

The rotor blades 22 may generally have any suitable length that enables the wind turbine 10 to function as described herein. Additionally, the rotor blades 22 may be spaced about the hub 20 to facilitate rotating the rotor 18 to enable kinetic energy to be transferred from the wind into usable mechanical energy, and subsequently, electrical energy. Specifically, the hub 20 may be rotatably coupled to an electric generator (not illustrated) positioned within the nacelle 16 to permit electrical energy to be produced. Further, the rotor blades 22 may be mated to the hub 20 at a plurality of load transfer regions 26. Thus, any loads induced to the rotor blades 22 are transferred to the hub 20 via the load transfer regions 26.

As shown in the illustrated embodiment, the wind turbine may also include a turbine control system or turbine controller 36 centralized within the nacelle 16. However, it should be appreciated that the controller 36 may be disposed at any location on or in the wind turbine 10, at any location on the support surface 14 or generally at any other location. The controller 36 may generally be configured to control the various operating modes of the wind turbine 10 (e.g., start-up or shut-down sequences). Additionally, the controller 36 may also be configured to control the blade pitch or pitch angle of each of the rotor blades 22 (i.e., an angle that determines a perspective of the rotor blades 22 with respect to the direction 28 of the wind) to control the load and power generated by the wind turbine 10 by adjusting an angular position of at least one rotor blade 22 relative to the wind. For instance, the controller 36 may control the pitch angle of the rotor blades 22, either individually or simultaneously, by transmitting suitable control signals to a pitch drive or pitch adjustment system 32 configured to rotate blades 22 along their longitudinal axes 34. It should be appreciated that the present invention also applies to stall regulated wind turbine machines.

Referring to the conventional construction of FIG. 2, the rotor blade 22 includes a suction side 52 and an opposite pressure side 54 extending between a leading edge 56 and a trailing edge 58. Further, the rotor blade 22 has a span 60 defining a total blade length between a blade root 38 and blade tip 40, as well as a chord 62 defining the total length between the leading edge 56 and the trailing edge 58. As is generally understood, the chord 62 may generally vary in length with respect to the span 60 as the rotor blade 22 extends from the blade root 38 to the blade tip 40.

The rotor blades 22 define any suitable aerodynamic profile or shape along an airfoil shaped (cross-sectional) spanwise length of the blade extending outward from the blade root 38. For example, the rotor blade 22 may be configured as a symmetrical airfoil or a cambered airfoil along this airfoil section. In addition, the rotor blade 22 may also be aeroelastically tailored along the airfoil section, which entails bending of the blade 22 in a generally chord-wise direction (parallel to the chord 62) and/or in a generally spanwise direction (parallel to the span 60). Aeroelastic tailoring may further entail twisting of the rotor blade 22, such as twisting the blade 22 in a generally chordwise and/or spanwise direction.

The blade root 38 is the component of the blade that is attached to the hub 20 of the wind turbine 10 and transfers load to the rotor hub 20 at the transfer region 26. The blade root 38 has a generally cylindrical shape and may be configured as relatively thick and rigid section of the rotor blade 22 so as to withstand the bending moments and other forces generated on the blade 22 during operation of the wind turbine 10. This non-airfoil cylindrical blade root 38 does not meaningfully contribute to the ability of the blade 22 to convert wind energy to mechanical energy.

In the conventional construction depicted in FIG. 2, the blade root 38 has an outwardly extending blade flange 42 configured at the root end 64 that aligns with and is mounted to a corresponding attachment component 44 of the hub 20. This component 44 is typically the pitch bearing or any other suitable load transfer component. In particular, the blade flange 42 may generally define a plurality of bolt holes 46 having a hole pattern corresponding to the pattern of bolt holes 48 defined in the a race of the pitch bearing ring 44. As such, the rotor blade 22 may be rigidly attached to the hub 20 using a plurality of bolts 50 or any other suitable attachment mechanisms and/or devices.

In the conventional construction depicted in FIGS. 2 and 3, the blade attachment flange 42 is directly radially inward at the end 64 of the blade root 38. In other embodiments, the attachment flange may be directed radially outwardly from the blade root end 64

Still referring to the prior art construction of FIG. 3, the pitch bearing has an inner diameter race 45 and an outer diameter race 46 that is fixed to the hub 20 via bolts or other suitable means. The pitch bearing has an interface diameter 72 defined at the interface of the outer diameter race 46 and inner diameter race 45 and an inner diameter 74 defined by the inner diameter race 45. The blade root section 38 has a diameter 68 that essentially corresponds to the interface diameter 72. The blade root section 38 has a spanwise length such that a transition length 70 is defined between the end 64 of the blade root 38 and a position along the length of the blade 22 wherein the blade transitions to the relatively thin airfoil section. It should be appreciated that this transition point may be defined at various locations, so long as the point is consistently defined at a particular transition location for purposes of comparing transition lengths 70 of prior art constructions (such as the construction in FIGS. 2 and 3) with constructions according to the present invention.

FIG. 4 depicts a rotor blade 22 having an assembly configuration 66 in accordance with aspects of the invention wherein a transition piece or adaptor 76 is configured between the root end 64 and the bearing ring 44. The adaptor 76 defines a mounting surface 78 on which the root end 64 is affixed. For example, in the embodiment depicted in FIG. 4, the blade flange 42 is bolted onto the mounting surface 78 with a plurality of bolts 50. The adaptor 76 and associated mounting surface 78 provides a means to reduce the root diameter 68 and diameter of the blade flange 42 to less than the inner diameter 74 of the pitch bearing 44, as particularly illustrated in FIG. 4. This configuration provides significant advantages. For example, the transition length 70 between the root end 64 and the airfoil section of the blade 22 may be decreased by shortening the spanwise length of the blade root 38, as can be appreciated by comparing the configuration of FIG. 4 with the prior art configuration of FIG. 3. As discussed above, for relatively large, modern wind turbines, the driving design factor at the transfer region 26 (FIG. 1) is often the pitch bearing 44, which requires a relatively large root end diameter 68 (FIG. 3). The adaptor 76 allows for a reduced root end diameter 68 and the related reduction in the transition length 70. The adaptor 76 effectively reduces the radius of curvature constraints in the blade design allowing for the reduced transition length 70.

In another aspect, the adaptor 76 effectively changes the overall length of the rotor blade 22 by the spanwise thickness or height of the adaptor 76, thereby changing the capability of the rotor blades 22 to convert kinetic energy from the wind into usable mechanical energy without actually increasing the spanwise length of the blade 22.

The adaptor 76 may be variously configured in accordance with aspects of the invention. For example, in the embodiment depicted in FIG. 4, the adaptor 76 is a plate member 80 having generally the same outer diameter as the inner bearing race 45. The plate 80 is bolted to the bearing race 45 with a plurality of bolts 50 and defines an essentially flat, planar, and continuous mounting surface 78 on which the blade flange 42 is mounted with bolts 50. With this plate-like configuration 80 of the adaptor 76, a plurality of different bolt hole patterns may be pre-defined in the plate 80 so that the plate may accommodate blade roots 38 having different root end diameters 68.

In an alternate configuration depicted in FIG. 5, the adaptor 76 is defined by a ring member 82 having an outer diameter that is essentially the same as the outer diameter of the ring bearing 44. The ring member 82 defines a ring-shaped mounting surface 78 onto which the blade flange 42 bolts.

It should be appreciated that the present invention is not limited to any particular amount of reduction of the blade root diameter 68 relative to the bearing ring 44. The percent reduction will vary according to numerous factors, such as overall blade length, blade design, load margins and designs, material characteristics of the assembly components, and so forth.

As discussed above, the pitch bearing ring 44 design is driven largely by the finite stiffness of the parts to which the bearing ring 44 mounts. Increasing the stiffness of the blade-side connection component will increase the load margins for a given size of the pitch bearing 44. In this regard, the adaptor 76 may be formed of a material that is comparable to or stiffer than the blade material. For example, in a particular embodiment, the adaptor 76 is formed from metal, such as a cast metal component, which is significantly stiffer than the composite material of the blade root end 38 (and overall blade 22). This metal component provides significantly greater stiffness so that the bearing ring 44 deforms less under load as compared to knotting of the blade root end 64 directly onto the bearing ring 44.

FIG. 6 depicts another embodiment of the assembly configuration 66 wherein the adaptor 76 provides a raised spanwise profile relative to the pitch bearing 44 such that the mounting surface 78 is offset by a distance 84 from a mounting end of the adaptor 76. For example, in the embodiment of FIG. 6, the adaptor 76 includes an outer ring 86 that mounts to the inner diameter race 45. Side walls 88 extend from the outer ring 86 and terminate at an upper plate member that defines the mounting surface 78. The side walls 88 define the offset and, in certain embodiments, may be sloped or truncated to further reduce the diameter 68 of the blade root end, as depicted in FIG. 6. As with the embodiment of FIG. 4, the root end 64 is bolted to the mounting surface 78. This embodiment provides a significantly different overall length of the blade 22 without changing the length of the root 38 and still allowing for a reduced transition length 70 as compared, for example, to the prior art construction of FIG. 3.

The embodiment depicted in FIG. 7 is similar to the embodiment of FIG. 6 except that the mounting surface 78 is defined at a non-parallel angle relative to the mounting face of the outer radial ring 86. With this embodiment, the adaptor 76 may serves to change the cone angle of the rotor without changing the blade or hub components. For example, the blade root end mounting surface 78 may be in a non-parallel plane relative to the plane of the bearing race 45 to which the adaptor 76 is attached, thereby providing an angular offset between the blade root centerline axis 92 and the pitch bearing centerline axis 90.

It should be appreciated that the present invention also includes various method embodiments in accordance with aspects discussed above. For example, referring to the figures in general, a method may be provided for reducing the spanwise transition 70 from a root end 64 to an airfoil section of a rotor blade 22 in a wind turbine having a given rotor blade diameter by assembling a transition component or adaptor 76 between the root end 64 and a bearing ring 44 on which the root end attaches. With the transition or adaptor component 76, the diameter 68 of the root end 64 may be reduced to less than an inner diameter 74 of the bearing ring 44. With this configuration, the spanwise or transition length 70 between the root end 64 and the airfoil section of the blade is reduced so as to increase the overall spanwise length of the airfoil section of the rotor blade 22.

The method may include providing an increased stiffness between the bearing ring 44 and rotor blade 22 by forming the transition component 76 from metal such that the bearing ring 44 deforms less under rotor blade induced loads. The method may thus further include increasing the design load margins for the bearing rings 44 as a function of the increased out-of-plane stiffness added by the transition component 76.

The method may further include changing (e.g., increasing) the overall rotor diameter without adding to the root 38 spanwise length by offsetting the mounting surface of the transition component 76 relative to the bearing ring 44, as discussed in the embodiment of FIG. 4 above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An assembly configuration between a wind turbine rotor blade and a rotor huh, comprising:
   a rotor hub having one or more pitch bearings, said bearings having an outer diameter race and an inner diameter race;
   a rotor blade affixed to said pitch bearings, said rotor blades comprising a root end having an outer diameter;
   an adaptor configured between said root end and said bearing, said adaptor affixed to said inner diameter race at a first location and said root end affixed to said adaptor;
   said adaptor defining a mounting surface for said root end radially inward of said inner diameter race such that said root end outer diameter is less than an inner diameter of said pitch bearing; and
   said root end separately bolted directly to said mounting surface radially inward of said first location for attachment of said rotor blade said pitch bearing; and
   said adaptor comprising a flat, planar, member so as to lie flush against said inner diameter race, said adaptor and said inner diameter race having the same outer diameter.

2. The assembly configuration as in claim 1, wherein said adaptor comprises a plate member.

3. The assembly configuration as in claim 2, wherein said adaptor comprises a ring member.

4. The assembly configuration as in claim 1, wherein said adaptor is formed from a material the same or a greater stiffness than said rotor blades.

5. The assembly configuration as in claim 4, wherein said rotor blades are a composite material and said adaptor is a composite or metal.

6. An assembly configuration between a wind turbine rotor blade and a rotor hub, comprising:
   a rotor hub having one or more pitch bearings, said bearings having an outer diameter race and an inner diameter race;
   a rotor blade affixed to said pitch bearings, said rotor blades comprising a root end having an outer diameter;
   an adaptor configured between said root end and said bearing, said adaptor affixed to said inner diameter race at a first location and said root end affixed to said adaptor;
   said adaptor defining a mounting surface for said root end radially inward of said inner diameter race such that said root end outer diameter is less than an inner diameter of said pitch bearing;
   said root end separately bolted directly to said mounting surface radially inward of said first location for attachment of said rotor blade to said pitch bearing;
   wherein said adaptor has a raised spanwise profile relative to said pitch bearing and comprises side walls extending transversely outward at an angle less than 90 degrees from a radially outer ring of said adaptor, said mounting surface defined at an end of said side walls;
   wherein the radially outer ring is affixed to said inner diameter race, said mounting surface circumscribed within said outer ring; and
   wherein said adaptor comprises a truncated cross-sectional profile.

7. The assembly configuration as in claim 6, wherein said adaptor comprises a radially outer ring affixed to said inner diameter race, said mounting surface circumscribed within said outer ring.

8. The assembly configuration as in claim 7, wherein said adaptor is metal and said rotor blade is a composite material.

9. The assembly configuration as in claim 8, wherein said mounting surface is defined in a non-parallel plane relative to a plane of said inner diameter race such that a centerline axis of said blade is offset relative to a centerline axis of said pitch bearing.

* * * * *